United States Patent
Sakai

[11] Patent Number: 6,086,505
[45] Date of Patent: Jul. 11, 2000

[54] SPEED CONTROL DEVICE OF TOROIDAL TYPE CONTINUOUSLY VARIABLE TRANSMISSION

[75] Inventor: Hiromasa Sakai, Kanagawa, Japan

[73] Assignee: Nissan Motor Co., Ltd., Yokohama, Japan

[21] Appl. No.: 09/249,069

[22] Filed: Feb. 12, 1999

[30]    Foreign Application Priority Data

Feb. 18, 1998  [JP]  Japan .................................. 10-036046

[51] Int. Cl.⁷ .................................................. F16H 61/30
[52] U.S. Cl. ................................... 476/10; 476/3; 476/4; 476/9
[58] Field of Search .................... 476/40, 42, 3, 476/4, 10, 9, 60

[56]         References Cited

U.S. PATENT DOCUMENTS

| 2,842,973 | 7/1958  | Crowe ........................................ 476/10 |
| 4,744,032 | 5/1988  | Miyaura et al. ........................... 476/10 |
| 5,674,145 | 10/1997 | Kidokoro et al. .......................... 476/3  |

FOREIGN PATENT DOCUMENTS

| 6-257661 | 9/1994 | Japan . |
| 7-198015 | 8/1995 | Japan . |

*Primary Examiner*—David M. Fenstermacher
*Attorney, Agent, or Firm*—Foley & Lardner

[57]          ABSTRACT

A pivotal feedback line has at one end thereof a follower member that is slidably put on a work surface of a precess cam actuated by a trunnion of a toroidal type continuously variable transmission. A speed control valve has a spool. The spool is moved for feeding a hydraulic actuator of the transmission with a hydraulic pressure to control the trunnion. An electric actuator has an output member. A speed change link is arranged to which the other end of the pivotal feedback link, the spool of the speed control valve and the output member of the electric actuator are connected through first, second and third articulated members respectively. A spring member is connected with the pivotal feedback link at a position between the first articulated member and the follower member to bias the pivotal feedback link in a direction to press the follower member against the work surface of the precess cam so that the biasing force of the first biasing member does not affect the moment of rotation of the speed change link about the first articulated member.

14 Claims, 9 Drawing Sheets

SPEED CONTROL DEVICE OF TOROIDAL TYPE CONTINUOUSLY VARIABLE TRANSMISSION

BACKGROUND OF THE INVENTION

1. Field of the Invention

The present invention relates in general to toroidal type continuously variable transmissions and more particularly to a speed control device of the toroidal type continuously variable transmissions.

2. Description of the Prior Art

In toroidal type continuously variable transmissions, there have been proposed various speed control devices, some of which are described in Japanese Patent First Provisional Publications 7-198015 and 6-257661.

For clarifying the task of the present invention, the speed control devices of such publications will be outlined in the following.

The speed control device of the 7-198015 publication comprises a speed change link having a generally middle portion pivotally connected to an extension of a spool of a speed control valve. Movement of the spool controls a flow of pressurized fluid to servo-pistons by which trunnions (viz., friction roller supporting members) are actuated. One end of the speed change link is pivotally connected to an axially movable slider driven by a step motor, and the other of the speed change link carries through a ball bearing an end of an L-shaped link (viz., feedback link) which is mounted on a pivot shaft. The other end of the L-shaped link is provided with a follower member that is slidably put on an inclined surface of a precess cam. The precess cam is actuated by one of the trunnions.

In the speed control device of the 6-257661, the follower member of the L-shaped link is slidably received in an inclined groove formed in a precess cam.

When, upon receiving a command signal from a controller, the step motor is energized to move through the slider the speed change link and thus the spool of the speed control valve, the pressurized fluid is fed to selected work chambers of the servo-pistons to induce pivoting movement of the friction rollers through the trunnions. During this, the pivoting movement of the friction rollers is fed back to the speed change link through the precess cam and the L-shaped link, so that the transmission ratio defined between input and output discs is automatically controlled to a target ratio determined by the command signal.

In the speed control devices of the above-mentioned publications, to assure the feedback control, a stronger biasing spring is employed for biasing the L-shaped link in a direction to press the follower member onto the inclined surface of the precess cam as well as suppressing play of some parts associated with the speed change link.

However, usage of such stronger spring causes employment of a higher-powered and thus expensive and large-sized step motor, because when operated in a direction to pull the speed change link, the step motor has to operate against the biasing force of the spring as well as a hydraulic force fundamentally applied to the spool. Due to usage of such step motor, the speed control devices of the above-mentioned publications tend to have expensive and large-sized construction.

SUMMARY OF THE INVENTION

It is therefore an object of the present invention to provide a speed control device of a toroidal type continuously variable transmission, which is free of the above-mentioned drawbacks.

According to the present invention, there is provided a speed control device of a toroidal type continuously variable transmission, which can assure the feedback control of the transmission without employment of a higher-powered, expensive and large-sized step motor.

According to the present invention, there is provided a speed control device of a toroidal type continuously variable transmission. The speed control device comprises a pivotal feedback link having at one end thereof a follower member that is slidably put on a work surface of a precess cam actuated by a trunnion of the transmission. A speed control valve has a spool. The spool is moved for feeding a hydraulic actuator of the transmission with a hydraulic pressure to control the trunnion. An electric actuator has an output member. A speed change link is arranged to which the other end of the pivotal feedback link, the spool of the speed control valve and the output member of the electric actuator are connected through first, second and third articulated members. A first biasing member is connected with the pivotal feedback link at a position between the first articulated member and the follower member to bias the pivotal feedback link in a direction to press the follower member against the work surface of the precess cam so that the biasing force of the first biasing member does not affect the moment of rotation of the speed change link about the first articulated member.

BRIEF DESCRIPTION OF THE INVENTION

DETAILED DESCRIPTION OF THE EMBODIMENTS

In the following description, directional terms such as, right, left, upper, lower, rightward, leftward, upward, downward and the like are to be understood with respect to the drawing or drawings on which the objective part or parts are illustrated.

Figure 10:
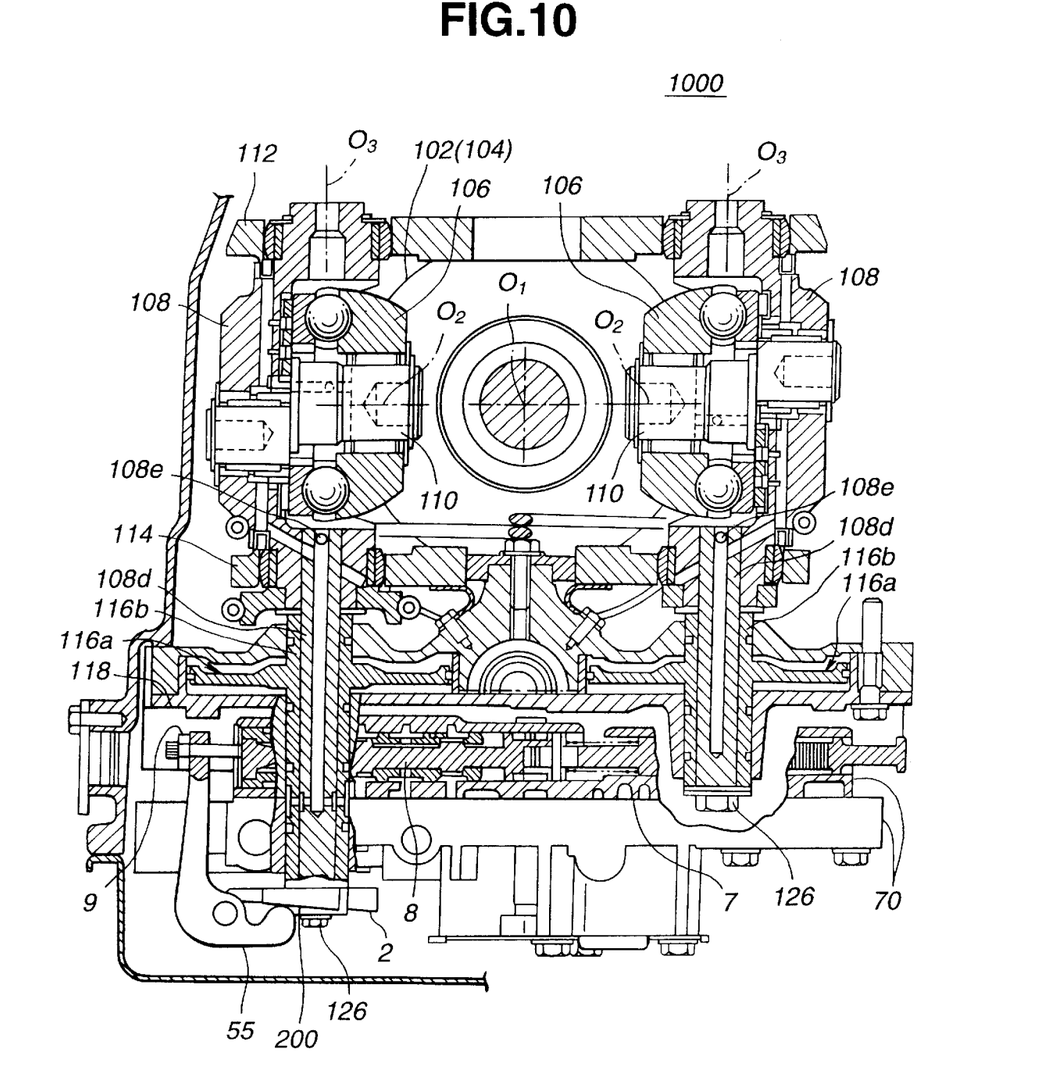
FIG. 10 is a sectional view of one known toroidal type continuously variable transmission to which the speed control device of the present invention is practically applicable.

Before making a detailed description on the present invention, one known toroidal type continuously variable transmission to which the speed control device of the invention can be practically applied will be described with reference to FIG. 10 for clarification of the invention.

As is shown in the drawing, the toroidal type continuously variable transmission 1000 comprises input and output cone discs 102 and 104 which are arranged on a common rotation axis "O1". Denoted by numerals 106 and 106 are friction rollers (or power rollers) which are each operatively interposed between the input and output cone discs 102 and 104. The friction rollers 106 and 106 are arranged to face each other with the axis "O1" placed therebetween, as shown. That is, each friction roller 106 is put in a toroidal space defined by both the input and output cone discs 102 and 104, while frictionally contacting with these discs 102 and 104. The friction rollers 106 and 106 are rotatably supported by respective trunnions 108 and 108 through respective eccentric shafts 110 and 110. The input and output cone discs 102 and 104, the two friction rollers 106 and 106 and the trunnions 108 and 108 constitute an essential portion of a toroidal power transmission unit.

In a double cavity toroidal type continuously variable transmission, two, that is, front and rear toroidal power transmission units are employed, which are coaxially arranged o the axis "O1" with their output cone discs 104 and 104 connected in a back-to-back connecting manner.

As is seen, the trunnions 108 and 108 have respective upper ends connected through an upper link 112 and respective lower ends connected through a lower link 114. The connection of these parts is so made that each trunnion 108 can pivot between a neutral position as shown in FIG. 10 wherein a rotation axis "O2" of the friction roller 106 intersects the rotation axis "O1" of the input and output cone discs 102 and 104 and an offset position wherein the trunnion 108 is inclined toward a pivot axis "O3" of the friction roller 106 which intersects the rotation axis "O2" at right angles. The trunnion 108 pivots about the pivot axis "O3".

For carrying out the above-mentioned offset movement, each trunnion 108 has a shaft 108d connected to a lower end thereof through a pin 108e, the shaft 108d extending in the direction of the pivot axis "O3". Tightly disposed on the shaft 108d is a servo-piston 116a which is axially movably received in a cylinder body 118.

As is seen from the drawing, the shaft 108d of one (viz., left one in the drawing) of the trunnions 108 and 108 has a lower extension projected downward beyond a control valve body 70, to which an after-mentioned precess cam 2 is connected.

The control valve body 70 has a control valve for generating a controlled hydraulic pressure to operate the servo-piston 116a. An L-shaped link 55 is incorporated with the precess cam 2, through which an offset degree of the trunnion 108 in the direction of the pivot axis "O3" and a rotation degree of the trunnion 108 about the pivot axis "O3" are fed back to a speed control valve 7 (more specifically, a spool 8 of the valve 7) in the control valve body 70. That is, one end of the L-shaped link 55 acts as a follower that slidably contacts with an inclined surface 20 of the precess cam 2. The other end of the L-shaped link 55 is connected to the spool 8 through a speed change link 9.

As shown, the left shaft 108d having the precess cam 2 connected thereto and a hollow boss portion 116b of the servo-piston 116a for receiving the left shaft 108d pass through the cylinder body 118 and the control valve body 70. While, the right shaft 108d having no precess cam and a hollow shaft portion 116b of the servo-piston 116a for receiving the right shaft 108d pass through only the cylinder body 118. Each shaft 108d has at a lower end a nut 126 secured thereto to achieve a united connection between the shaft 108d and the associated servo-piston 116a.

Upon receiving a speed change ratio command, the speed control valve 7 applies the servo-pistons 116a and 116a with a hydraulic pressure corresponding to the content of the command. With this, each servo-piston 116a forces through the corresponding shaft 108d the trunnion 108 to pivot between the above-mentioned neutral position of FIG. 10 and the offset position. Due to this pivoting, each friction roller 106 is pivoted about the pivot axis "O3" while bearing a component force applied thereto from the input and output cone discs 102 and 104, so that the rotation speed of the output cone disc 104 is continuously varied relative to that of the input cone disc 102. That is, due to continuously changing contact points of the friction rollers 106 and 106 to the input and output cone discs 102 and 104, the speed change ratio is continuously varied between the input and output cone discs 102 and 104. That is, a continuously variable speed change is carried out.

During the variable speed change, the above-mentioned feedback control is achieved, so that with progression of the speed change, the trunnions 108 and 108 are forced to return toward their original positions, and when the existing speed change ratio becomes in agreement with a target value of the command, the trunnions 108 and 108 are returned to the original positions bringing the friction rollers 106 and 106 back to their neutral positions. With this, the speed change ratio can be kept at the target value.

Figure 1:
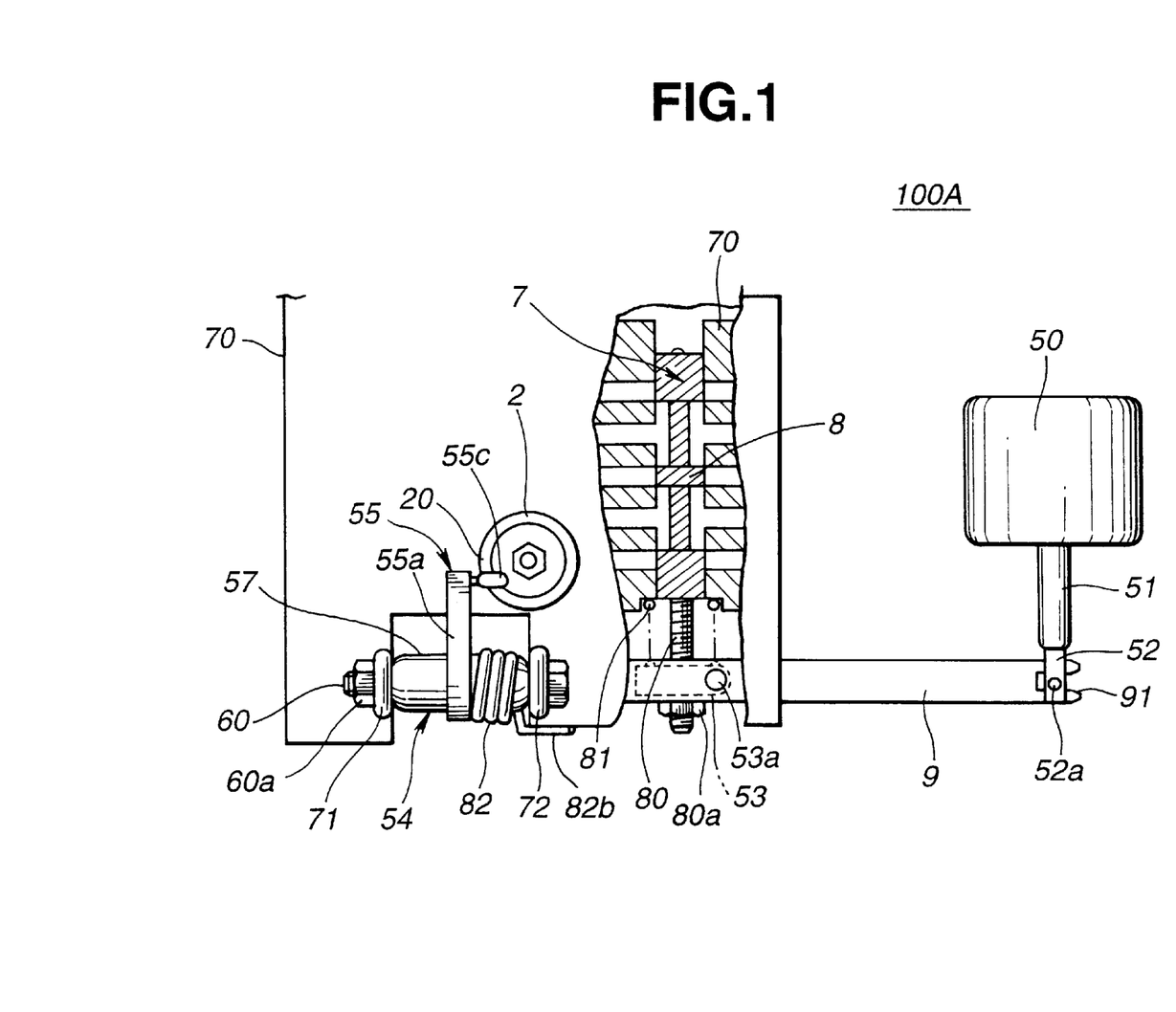
FIG. 1 is a partially cut schematic plan view of a speed control device of a first embodiment of the present invention, which is taken from a bottom of an associated continuously variable transmission.
Figure 2:
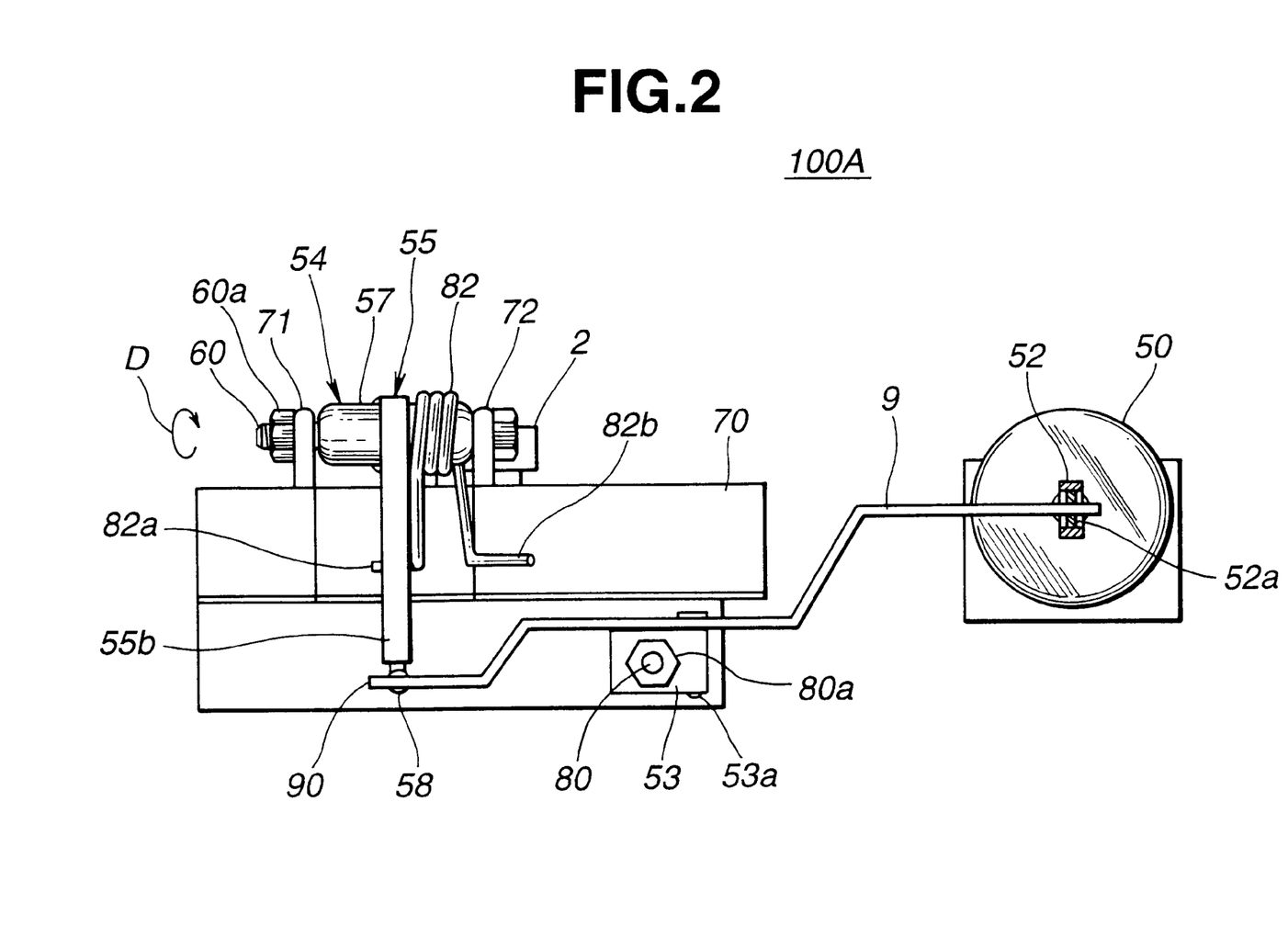
FIG. 2 is a schematic front view of the speed control device of the first embodiment.
Figure 3:
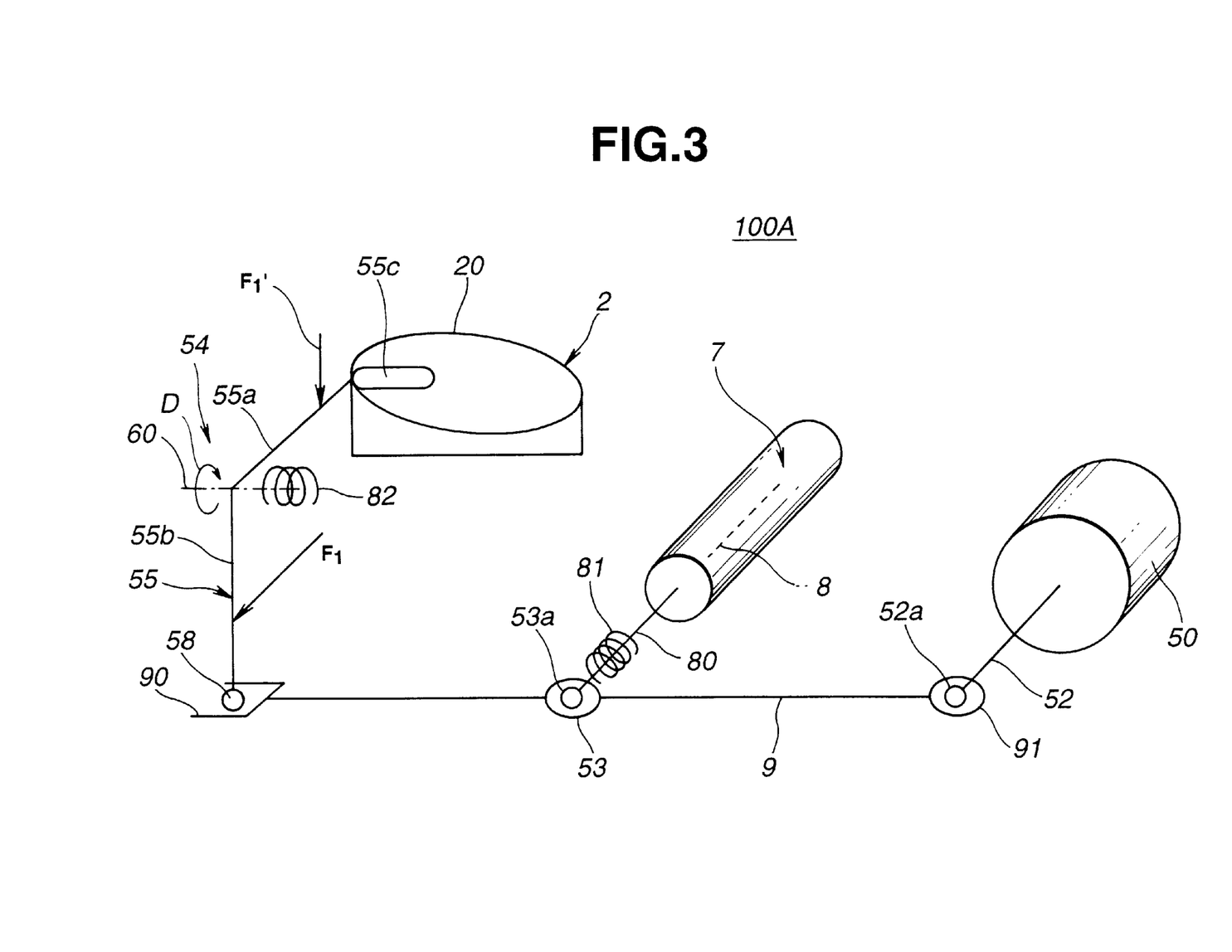
FIG. 3 is a conceptual view of the speed control device of the first embodiment.

Referring to FIGS. 1, 2 and 3, particularly FIGS. 1 and 2, there is shown a speed control device 100A of a first embodiment of the present invention, which can be practically applied to the above-mentioned toroidal type continuously variable transmission 1000.

As shown in the drawings, the speed control device 100A comprises a speed change link 9 connected to an extension part 80 of a spool 8 of the speed control valve 7.

As is seen from FIGS. 1 and 2, the extension part 80 of the spool 8 is threaded, and the speed change link 9 has at a generally middle portion thereof a pivot pin 53a through which a connecting plate 53 is pivotally connected to the link 9. As is seen from FIG. 2, the threaded extension part 80 of the spool 8 is connected to the connecting plate 53 by means of a nut 80a.

As is seen from FIG. 1, a coil spring 81 is disposed about the extension part 80 of the spool 8 and compressed between an end of the valve body 70 and the connecting plate 53. With this, the pivotal connecting plate 53 is biased to take a stable position relative to the speed change link 9.

As seen from FIG. 1, at a right side of the speed control valve 7, there is arranged a step motor 50 that actuates the speed change link 9 in accordance with a control signal applied thereto from a control unit (not shown), and at a left side of the speed control valve 7, there is arranged a feedback link mechanism 54 that transmits or feeds back a movement of the precess cam 2 to the speed change link 9.

As shown, the step motor 50 has a feed screw output shaft 51 by which a forked slider 52 (see FIG. 2) is axially driven. The slider 52 is equipped with a pin 52a that is held in a recess 91 formed in the right end of the speed change link 9. That is, the slider 52 is pivotally connected with the right end of the link 9.

As is seen from FIGS. 1 and 2, the feedback link mechanism 54 comprises an L-shaped link 55 that is secured to a hollow member 57. That is, the L-shaped link 55 comprises a first arm 55a (see FIG. 1) and a second arm 55b (see FIG. 2) which intersect at generally right angles. The hollow member 57 is pivotally supported by a headed shaft 60 that passes through the hollow member 57. As is seen from FIG. 2, the headed shaft 60 is supported by two brackets 71 and 72 raised from the control valve body 70 and secured to the brackets 71 and 72 by means of a nut 60a.

As is seen from FIG. 1, the first arm 55a of the L-shaped link 55 is equipped with a follower member 55c that slidably contacts with the inclined surface 20 of the precess cam 2. As is seen from FIG. 2, the second arm 55b is equipped at its leading end with a ball 58 that is rotatably held in a concave recess 90 formed in the left end of the speed change link 9.

As is best seen from FIG. 2, a torsion spring 82 is disposed about the hollow member 57 having one end 82a hooked to the second arm 55b of the L-shaped link 55 and the other end 82b hooked to one edge of the control valve body 70. With this, the L-shaped link 55 is biased in a direction "D" to press the follow pin 55c against the inclined surface 20 of the precess cam 2.

Accordingly, as is seen from FIG. 3, the biasing force "F1" (viz., torsional moment) of the torsion spring 82 applied to the second arm 55b of the L-shaped link 55 forces, through the headed shaft 60, the follower member 55c to be pressed against the inclined surface 20 of the precess cam 2 with a biasing force of "F1". Thus, undesired separation of the follower member 55c from the inclined surface 20 never occurs during operation of the speed control device 100A.

It is to be noted that under contacting of the follower member 55c with the inclined surface 20 of the precess cam 2, the biasing force "F1" of the torsion spring 82 applied to the second arm 55b does not cause the ball 58 to be pressed against one side of the concave recess 90 of the speed change link 9. It is further to be noted that since the point of application of the biasing force "F1" is the ball 58, the moment of rotation of the speed change link 9 about the articulated connection between the L-shaped link 55 and the speed change link 9 is not affected by the biasing force of the torsion spring 82.

As is seen from FIG. 3, actually, there is produced a gap between the concave recess 90 and the ball 58, between the connecting plate 63 and the pivot pin 53a and/or between the recess 91 and the pin 52a, which may cause a play of the speed change link 9 relative to the L-shaped link 55, the spool 8 and the slider 52. However, such undesired play is eliminated by the coil spring 81 compressed between the valve body 70 and the connecting plate 53. That is, as is seen from FIG. 1, by the spring 81, the L-shaped link 55 is kept biased downward in the drawing.

It is to be noted that the biasing force of the torsion spring 82 is set greater than that of the coil spring 81. With this, the follower member 55c is constantly in contact with the inclined surface 20 of the precess cam 2 irrespective of movement of the speed change link 9. That is, if the biasing force of the torsion spring 82 is set smaller than that of the coil spring 81, separation of the follower member 55c from the precess cam 2 tends to occur, which, of course, lowers the intended feedback control.

It is to be noted that the biasing force of the coil spring 81 can be set as small as possible so long as it can eliminate the play of the speed change link 9 relative to the L-shaped link 55, the spool 8 and the slider 52. The smaller biasing force of the coil spring 81 may cause the spool 8 to take a halt position due to the force of the hydraulic pressure applied thereto. However, even in this case, once a play between the speed change link 9 and the pivot pin 53a becomes zero due to movement of the link 9, the spool 8 is instantly actuated by the step motor 50 and/or the L-shaped link 55 and thus an error caused by such play can be negligible.

As has been mentioned hereinabove, in the first embodiment 10A, due to provision of the torsion spring 82, the follower member 55c of the L-shaped link 55 is assuredly and constantly contracted to the inclined surface 20 of the precess cam 2. With this, the feedback control is assuredly achieved. The biasing force of the torsion spring 82 has substantially no effect on the moment of rotation of the speed change link 9 about the articulated connection between the L-shaped link 55 and the speed change link 9. Thus, the output needed by the step motor 50 for actuating the spool 8 of the speed control valve 7 is only a force that can move the spool 8 against the smaller biasing force of the coil spring 81 and the hydraulic force fundamentally applied to the spool. Accordingly, the step motor 50 employed in the invention can be of a lower-powered and thus small-sized type, unlike the case of the above-mentioned conventional speed control devices.

If desired, pillow block units may be used as the articulated connections of the L-shaped link 55, the extension part 80 of the spool 8 and the slider 52 of the step motor 50 relative to the speed change link 9. In this case, the coil spring 81 can be removed and thus the output needed by the step motor 50 can be much lowered.

Figure 4:
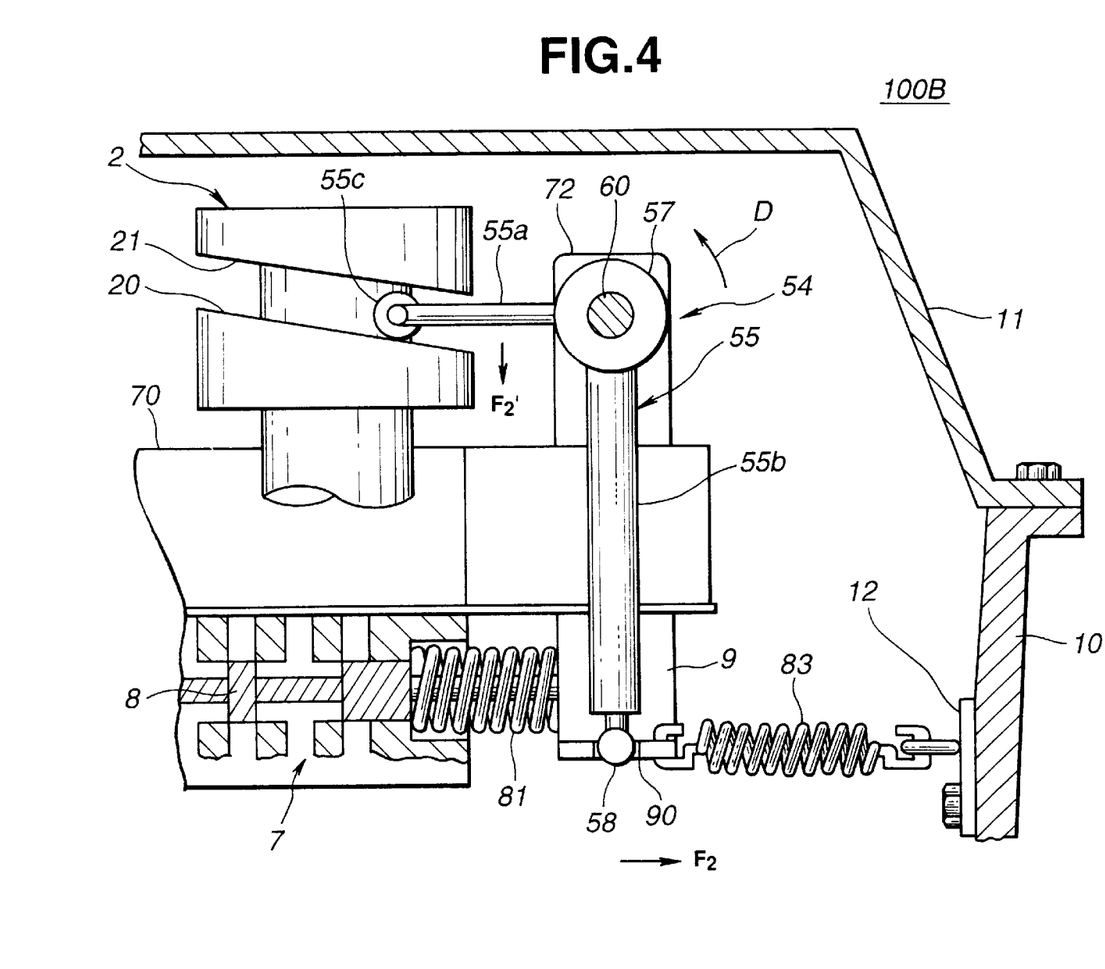
FIG. 4 is a partially cut side view of a speed control device of a second embodiment of the present invention.
Figure 5:
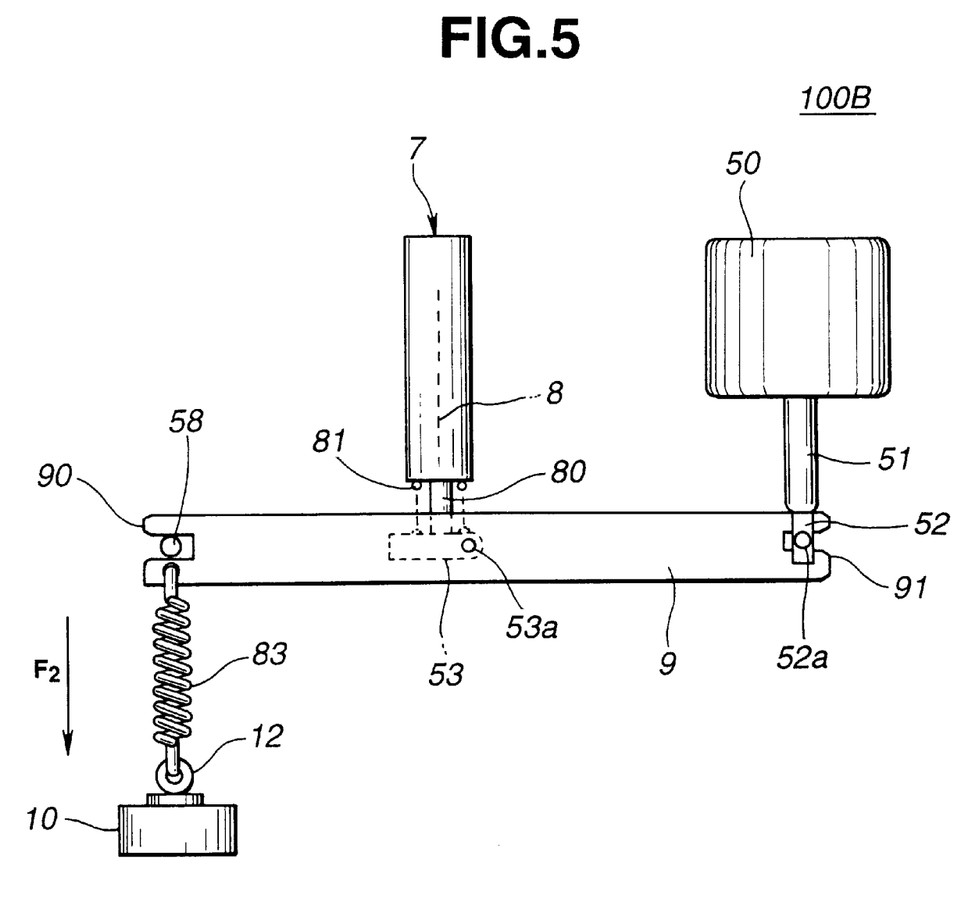
FIG. 5 is a schematic plan view showing only essential parts employed in the speed control device of the second embodiment.

Referring to FIGS. 4 and 5, there is shown a speed control device 100B of a second embodiment of the present invention. In these drawings, substantially same parts are those of the above-mentioned first embodiment are denoted by the same numerals.

In the second embodiment 100B, a pull spring 83 is employed in place of the torsion spring 82 employed in the above-mentioned first embodiment 100A.

That is, as is seen from the drawings, in the second embodiment 100B, the pull spring 83 extends between the end of the speed change link 9 where the concave recess 90 is formed and a spring holder 12 which is secured to a case 10 of the associated transmission.

With the pull spring 83, the L-shaped link 55 is biased to pivot in a direction of the arrow "D" in FIG. 4, that is, in a direction to press the follower member 55c against the inclined surface 20 of the precess cam 2. That is, the articulated connection between the concave recess 90 and the ball 58 is kept pulled toward the spring holder 12 with a biasing force "F2" of the pull spring 83, as shown in the drawings, causing the follower member 55c to be pressed against the inclined surface 20 of the precess cam 2 with a biasing force "F2'".

As shown in FIG. 4, in the second embodiment 100B, the inclined surface 20 of the precess cam 2 is defined in an inclined groove that has another inclined surface 21. These two inclined surfaces 20 and 21 extend in parallel with each other. As shown, a certain clearance is left between the follower member 55c and the inclined surface 21 for avoiding a scuffing between the follower member 55c and the surfaces 20 and 21 of the groove, which would occur when the precess cam 2 is inevitably tilted during torque transmission between the input and output cone discs 1 and 2 (see FIG. 10).

In the second embodiment 100B, substantially same advantages as those of the above-mentioned first embodiment 100A are obtained. That is, also in this second embodiment 100B, the biasing force of the pull spring 83 has substantially no effect on the moment of rotation of the speed change link 9 about the articulated connection between the L-shaped link 55 and the speed change link 9 because the point of application of the biasing force "F2" is very close to the ball 58.

Figure 6:
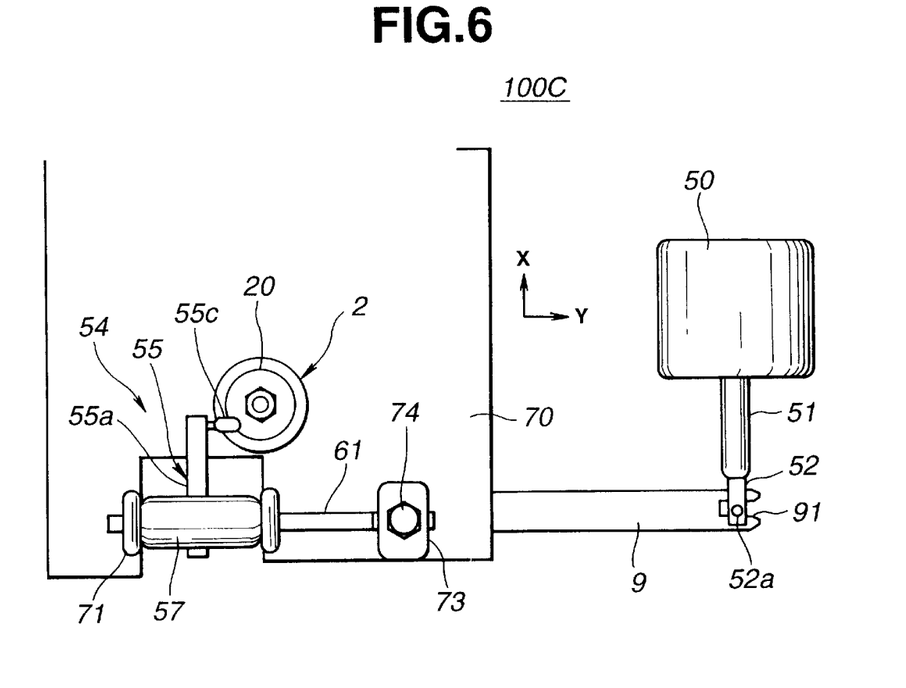
FIG. 6 is a schematic plan view of a speed control device of a third embodiment of the present invention, which is taken from a bottom of an associated continuously variable transmission.
Figure 7:
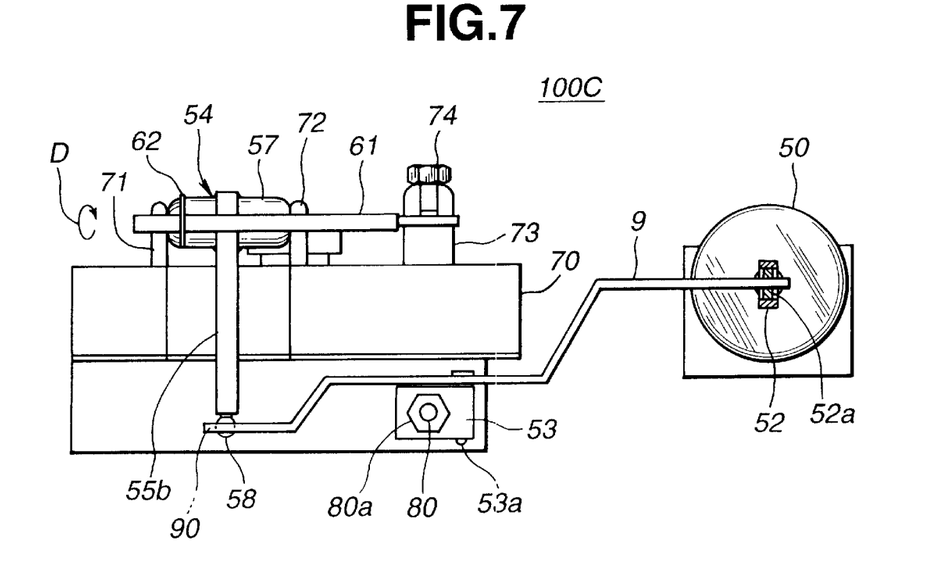
FIG. 7 is a schematic front view of the speed control device of the third embodiment.

Referring to FIGS. 6 and 7, there is shown a speed control device 100C of a third embodiment of the present invention.

In this third embodiment 100C, a torsion bar 61 is employed in place of the torsion spring 82 employed in the first embodiment 100A.

That is, as is seen from the drawings, in the third embodiment 100C, the torsion bar 61 has a right end fixed to a projection 73 of the valve body 70 through a bolt 74. The torsion bar 61 has a left portion that passes through the bracket 72, the hollow member 57 and the bracket 71. As is seen from FIG. 7, a connecting pin 62 is installed in the hollow member 57 to connect the torsion bar 61 to the hollow member 57.

With the torsion bar 61, the L-shaped link 55 is biased to pivot in a direction of the arrow "D" in FIG. 7, that is, in a direction to press the follower member 55c against the inclined surface 20 of the precess cam 2. That is, the articulated connection between the concave recess 90 (see FIG. 7) and the ball 58 is kept pulled toward this side in FIG. 7 causing the follower member 55c to be pressed against the inclined surface 20 of the precess cam 2 with a certain biasing force.

In the third embodiment 100C, substantially same advantages as those of the above-mentioned first embodiment 100A are obtained. That is, also in this third embodiment 100C, the biasing force of the torsion bar 61 has substantially no effect on the moment of rotation of the speed change link 9 about the articulated connection between the L-shaped link 55 and the speed change link 9.

Figure 8:
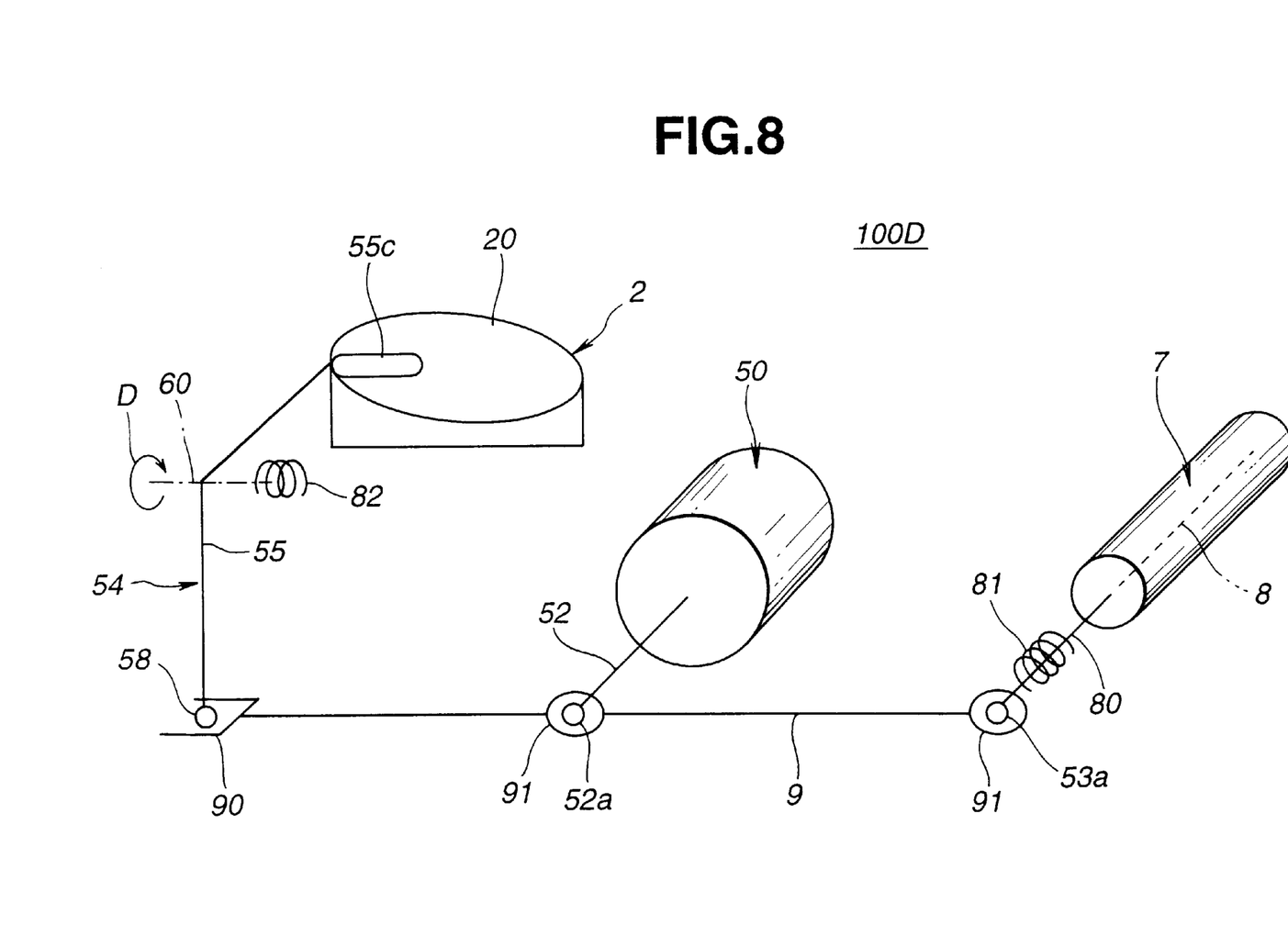
FIG. 8 is a view similar to FIG. 3, but showing a fourth embodiment of the present invention.
Figure 9:
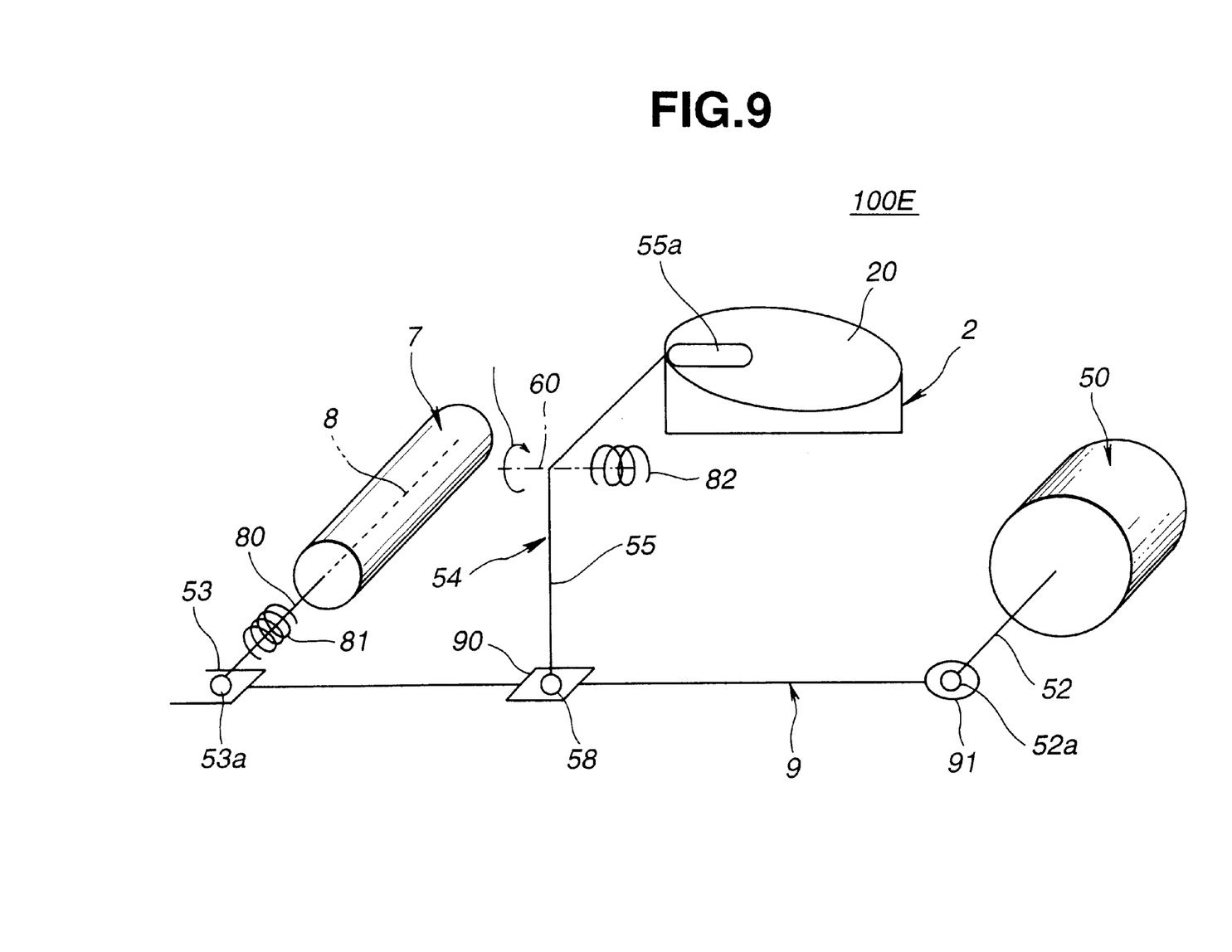
FIG. 9 is a view similar to FIG. 3, but showing a fifth embodiment of the present invention.

Referring to FIGS. 8 and 9, there are respectively shown in a schematic manner speed control devices 100D and 100E of fourth and fifth embodiments of the present invention.

These embodiments 100D and 100E are substantially the same as the above-mentioned first embodiment 100A except for arrangement of the feedback link mechanism 54, the step motor 50 and the speed control valve 7.

That is, in the fourth embodiment 100D, the step motor 50 is arranged between the feedback link mechanism 54 and the speed control valve 7. The slider 52 from the step motor 50 is pivotally connected to a middle portion of the speed change link 9 through the recess 91 and the pin 52a. While, the extension part 80 of the spool 8 of the speed control valve 7 is pivotally connected to a right end of the speed change link 9 through the connecting plate 53 and the pivot pin 53a.

In the fifth embodiment 100E, the feedback link mechanism 54 is arranged between the speed control valve 7 and the step motor 50. The extension part 80 of the spool 8 of the speed control valve 7 is pivotally connected to a left end of the speed change link 9 through the connecting plate 53 and the pivot pin 53a, the L-shaped link 55 is pivotally connected to a middle portion of the speed change link 9 through the ball 58 and the concave recess 90, and the slider 52 from the step motor 50 is pivotally connected to a right end of the speed change link 9 through the recess 91 and the pin 52a.

In the fourth and fifth embodiments 100D and 100E, substantially same advantages as those of the first embodiment 100A are obtained. That is, also in these embodiments, due to the constant engagement of the follower member 55c with the inclined surface 20 of the precess cam 2, the biasing force of the torsion spring 82 has substantially no effect on the moment of rotation of the speed change link 9 about the articulated connection between the L-shaped link 55 and the speed change link 9 irrespective of the changing in arrangement of the devices 54, 50 and 7.

The entire contents of Japanese Patent Application P10-36046 (filed Feb. 18, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A speed control device of a toroidal type continuously variable transmission, comprising:

a pivotal feedback link having at one end thereof a follower member that is slidably put on a work surface of a precess cam actuated by a trunnion of said transmission;

a speed control valve having a spool, said spool being moved for feeding a hydraulic actuator of said transmission with a hydraulic pressure to control said trunnion;

an electric actuator having an output member;

a speed change link to which the other end of said pivotal feedback link, the spool of said speed control valve and the output member of said electric actuator are connected through first, second and third articulated members respectively; and a first biasing member connected with said pivotal feedback link at a position between said first articulated member and said follower member to bias said pivotal feedback link in a direction to press said follower member against the work surface of said precess cam so that the biasing force of said first biasing member does not affect the moment of rotation of said speed change link about said first articulated member.

2. A speed control device as claimed in claim 1, in which said first biasing member is a coiled torsion spring that is disposed at its coil portion about a hub portion of said pivotal feedback link, said torsion spring having one end hooked to a fixed portion of the speed control device and the other end hooked to a portion of said pivotal feedback link.

3. A speed control device as claimed in claim 2, in which said hub portion of said pivotal feedback link is secured to a hollow member that is pivotally supported through a shaft on brackets raised from said fixed portion.

4. A speed control device as claimed in claim 1, in which said first biasing member is a pull spring that extends between the other end of said pivotal feedback link and a fixed portion of the speed control device.

5. A speed control device as claimed in claim 4, in which said pull spring has one end pivotally connected to the other end of said pivotal feedback link and the other end pivotally connected to a spring holder secured to said fixed portion.

6. A speed control device as claimed in claim 1, in which said electric actuator is arranged between said pivotal feedback link and said speed control valve.

7. A speed control device as claimed in claim 1, in which said pivotal feedback link is arranged between said speed control valve and said electric actuator.

8. A speed control device as claimed in claim 1, further comprising a second biasing member that is connected with said speed change link to bias the same in a direction away from the other end of said pivotal feedback link, the spool of said speed control valve and the output member of said electric actuator.

9. A speed control device as claimed in claim 8, in which the biasing force produced by said second biasing member operates in a direction to assist the biasing work of said first biasing member.

10. A speed control device as claimed in claim 1, in which said first biasing member is a torsion bar that is held on a fixed portion of said speed control device and connected to a hub portion of said pivotal feedback link.

11. A speed control device as claimed in claim 10, in which said torsion bar has one end fixed through a bolt to a projection formed on said fixed portion, said torsion bar extending through the hub portion of said pivotal feedback link and being connected to the same through a connecting pin, said torsion bar being pivotally supported on brackets raised from said fixed portion.

12. A speed control device as claimed in claim 1, in which said speed control valve is arranged between said pivotal feedback link and said electric actuator.

13. A speed control device of a toroidal type continuously variable transmission, comprising:

a pivotal feedback link having at one end thereof a follower member that is slidably put on a work surface of a precess cam actuated by a trunnion of said transmission;

a speed control valve having a spool, said spool being moved for feeding a hydraulic actuator of said transmission with a hydraulic pressure to control said trunnion;

an electric actuator having an output member;

a speed change link to which the other end of said pivotal feedback link, the spool of said speed control valve and the output member of said electric actuator are connected through first, second and third articulated members respectively;

a biasing member connected with said pivotal feedback link at a position between said first articulated member and said follower member to bias said pivotal feedback link in a direction to press said follower member against the work surface of said precess cam so that the biasing force of said biasing member does not affect the moment of rotation of said speed change link about said first articulated member; and a coil spring compressed between a valve body of said speed control valve and said speed change link to bias the latter in a direction away from the other end of said pivotal feedback link, the spool of said speed control valve and the output member of said electric actuator.

14. A speed control device of a toroidal type continuously variable transmission having a feedback system, comprising:

a pivotal feedback link having at one end thereof a follower member that is slidably put on a work surface of a precess cam actuated by a trunnion of said transmission;

a speed control valve having a spool, said spool being moved for feeding a hydraulic actuator of said transmission with a hydraulic pressure to control said trunnion;

an electric actuator having an output member;

a speed change link to which the other end of said pivotal feedback link, the spool of said speed control valve and the output member of said electric actuator are connected through first, second and third articulated members respectively; and biasing means for biasing said pivotal feedback link in a direction to press said follower member against the work surface of said precess cam so that the biasing force of said first biasing member does not affect the moment of rotation of said speed change link about said first articulated member.

* * * * *